Nov. 1, 1966  R. E. BARTH  3,282,603
VEHICULAR FRAME AND METHOD OF CONSTRUCTION
Filed Jan. 24, 1964  3 Sheets-Sheet 1

INVENTOR
ROBERT E. BARTH

BY K. M. LEFEVER
ATTORNEY

Nov. 1, 1966 R. E. BARTH 3,282,603
VEHICULAR FRAME AND METHOD OF CONSTRUCTION
Filed Jan. 24, 1964 3 Sheets-Sheet 2
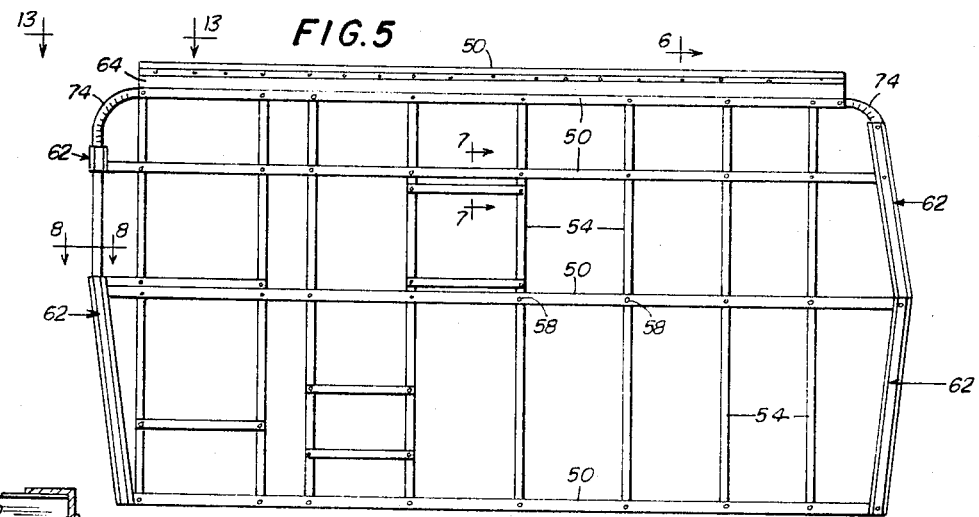
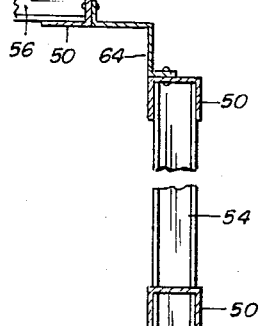
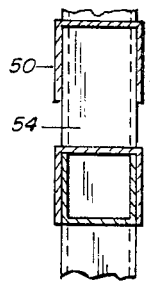
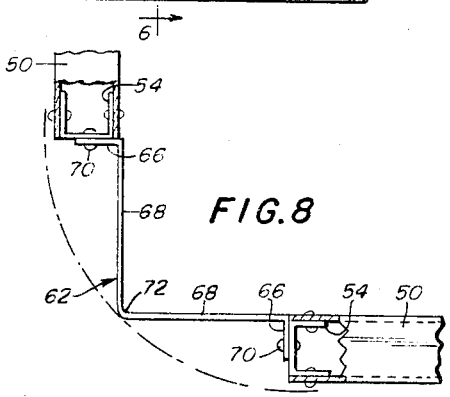
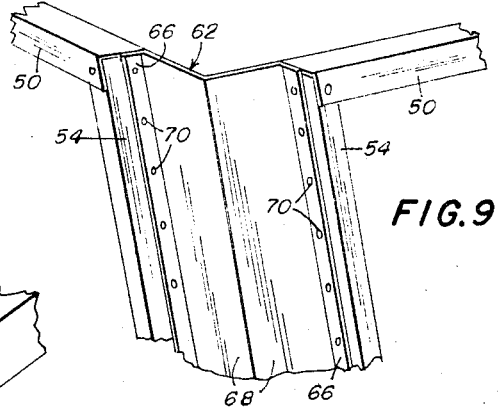
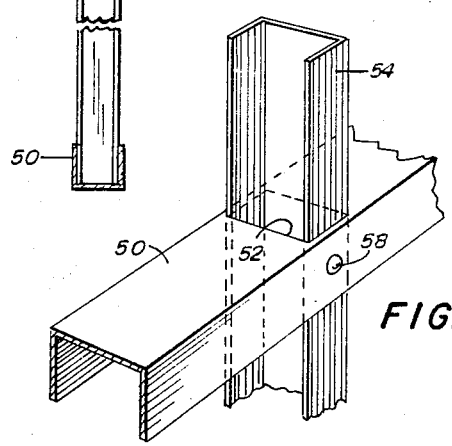
INVENTOR
ROBERT E. BARTH
BY K. M. LEFEVER
ATTORNEY Nov. 1, 1966    R. E. BARTH    3,282,603
VEHICULAR FRAME AND METHOD OF CONSTRUCTION
Filed Jan. 24, 1964    3 Sheets-Sheet 3

INVENTOR
ROBERT E. BARTH

BY K. M. LEFEVER

ATTORNEY

United States Patent Office 3,282,603
Patented Nov. 1, 1966

3,282,603
VEHICULAR FRAME AND METHOD OF CONSTRUCTION
Robert E. Barth, Milford, Ind.
(R.R. 1, Warsaw, Ind.)
Filed Jan. 24, 1964, Ser. No. 339,991
4 Claims. (Cl. 280—106)

This invention relates to vehicular frames and their method of construction. Particularly the invention relates to frame construction for vehicles which are designed to supply a maximum amount of interior volume. More particularly the invention relates to frame construction and design for towed vehicles such as trailers, vans and the like. Still more particularly the invention relates to the frame construction and design of a specific line of mobile vehicles which may be termed travel coaches or travel trailers.

Towed vehicles which are designed to provide a maximum amount of interior area or volume are generally classed in one of four categories: vans, mobile homes, travel trailers or campers. Vans ordinarily are not furnished with living accommodations. Mobile homes, travel trailers and campers regularly are furnished to a differing degree. Mobile homes, for example, are normally furnished completely and are designed to be exactly what the name implies—completely furnished homes which may be moved from one location to another, usually at infrequent intervals. That is, a mobile home is designed to remain for the greater part of its life in one spot—yet is mobile in that it can be moved to a different location. Travel trailers—or travel coaches—and campers, on the other hand, are designed to be moved frequently to different locations and thus are designed with this purpose in mind—to withstand the added stresses that more frequent movement causes and to eliminate as much wind resistance as possible during movement.

It is to these latter types of towed vehicles that the instant invention is directed.

It is thus an object of the present invention to provide a vehicular frame construction of new and improved design.

It is a further object of the invention to provide a frame construction for towed vehicles which has maximum strength and stability with minimum weight.

A further object of the invention is to provide an underframe or chassis for a towed vehicle which is of unitary construction and which furnishes a stable support for a towed vehicle having maximum strength and minimum weight.

A further object of the invention is to provide a frame for a towed vehicle having a unique corner framing feature which permits exterior air-flow design characteristics to be combined with an interior of maximum volume.

Other and further objects will become apparent as the description proceeds.

Generally speaking the inventive concept relates to a unique construction for towed vehicles which comprises several major features. One feature is directed to a chassis or under-frame which is of unitary construction and consists of three or more longitudinal main support members of seamless or welded rectangular tube construction which are passed through perforated Z-shaped cross members. At points of intersection the main support and cross members are welded into a unitary construction. A second feature of the construction of the invention relates to the top and side framing members. These members comprise horizontal and cross or vertical members of C-channel construction with the cross or vertical members of slightly smaller dimension than the horizontal members. The horizontal members are perforated at regular spaced intervals and the cross or vertical members are passed therethrough and the adjacent flanges are riveted together, thus forming a unitary member of exceptional rigidity and strength. Another feature of the construction of the invention is directed to a unique corner squaring member for joining the top to the sides and the sides to each other. This member is in the shape of an open W—with each angle a right angle and with the two outside flanges shorter than the interior sides. The outside flanges are mounted directly on the edges of the joining sides or the top and sides and space apart the joined members as well as furnishing a square interior conjunction angle which is flush with the interior surfaces of the joined members. Still another feature of the unique construction of the invention is the angular arrangement of the lower half of the front side—or end— and both halves of the rear side—or end. These halves incline from the middle of the frame inwardly at an angle between 5° and 20° so as to approach the desired aerodynamic configuration and decrease as much as is consonant with space considerations, air resistance and drag during movement.

These features, briefly described above, will be more explicitly explained hereinafter.

A. *Construction of under-frame or bottom framing member*

A major feature of the novel construction to which the instant invention is directed lies in the construction of the bottom framing member or under-frame. This frame constitutes the main support for the vehicle and with the running gear, constitutes the vehicular chassis. Since it bears the total load of the vehicle it has been designed to furnish maximum support strength with a minimum weight.

Briefly the novel frame construction comprises three or more parallel spaced apart main support members which extend the complete length of the under-frame. These main support members comprise rectangular box beams or tube members—that is, they are rectangular in cross section. It is preferred that they be of seamless tube construction. However it is also contemplated that they may be formed from flat plate stock broken into a box structure with a continuous weld at the point of conjunction of the ends.

At least two of the longitudinal main support members extend beyond the rear end of the frame an equal distance. There is then rigidly attached to these ends a cross member of a lesser dimension than the total frame width which serves as a rear bumper for the completed vehicle. This cross member may be a pipe, a flat stock length, a continuous weld rectangular tube but is preferably of seamless tube construction of the same dimension as the longitudinal main support members.

A plurality of parallel spaced cross members comprise the cross supports of the under-frame. These cross members are channels of a right-angled Z configuration in cross section, that is, one flange forms a right angle in one direction with the larger dimension of the channel and the other flange forms a right angle in the opposite direction. The main or vertical portion of the Z channel cross members are perforated at equally spaced intervals with a perforation of a slightly larger dimension than the outside dimension of the longitudinal main support members and the latter are inserted therethrough. The cross members are held firmly in place in relation to the main support members by a continuous weld around the conjunction of the cross members and the main support members. However they may be held in the desired position by rivetting the flanges of the Z channel members to the tube member or by spot-welding or by other techniques known to the art.

The sides of the under-frame are formed by additional lengths of the Z channel and in this instance the cross members are abutted against the main or vertical portion of the Z channel and welded in position. All cross support members and the sides are arrange so that the upper flange of the Z channel is directed toward the center of the frame.

Intermediate the center of the under-frame construction there are provided two opposed wheel wells. These wheel wells are formed of sheet metal, preferably aluminum of a design to permit free rotation of the wheel therein. The wheel wells are rigidly attached to the under-frame by means of rivets, screws, or the like.

The towing extension of the under-frame comprises a central member which is an extension of the center main support member and two side brace members which are of the same construction as the main support members. These side brace members extend through dimensioned perforations in the forward cross frame member and are mitered and welded by a continuous weld to the main support member immediately adjacent to each of the central support members. At the forward end they are similarly mitered and welded to the central main support member, thus forming a rigid unitary towing extension arrangement. The trailer hitch and the front support wheel are attached to the point of conjunction of the central main support member and the two side brace members in a manner conventional and known to the art.

B. *Side wall and top framing member construction*

The side walls including front and rear sides or ends of the vehicular frame of this invention and the top framing member are constructed of extruded aluminum channel which is substantially U-shaped in cross section. The side walls consist of horizontal framing members and vertical framing members. The top consists of horizontal and cross framing members. The horizontal framing members of both the sides and top are of a dimension such that the inside dimension of the U-shaped channel is slightly larger than the outside dimension of the cross framing members of the top and the vertical framing members of the sides. Thus a section of the horizontal framing members would receive in nesting relation a similar section of a cross or vertical framing member. At equal spaced relation the horizontal framing members of both the top frame and side frames are perforated to received therethrough the cross framing members of the top and vertical framing members of the side construction. This perforation may be of rectangular dimension or may be of a U-shaped configuration of a size which is just sufficient to receive the smaller channel therethrough. Thus it is to be seen that when the horizontal members are perforated in equally spaced relation and the cross members of the top, and the vertical members of the sides, are inserted through the perforations, the flanges or lips of the channel members lie in perpendicular relation with their planes parallel to each other. In this position the flanges of the respective channels are riveted together. At each conjunction there are two sets of perpendicular flanges and each set is preferably riveted together with a separate rivet. Although it is within the purview of the invention to use one long rivet through all four flanges it has been found that a more stable construction results when two separate rivets are used to join the separate pairs of flanges together with individual rivets.

In the top frame construction as well as the side and end frames all of the channels open toward the center. The horizontal and vertical framing members which constitute the outside edge or periphery of the frames are not perforated and the respective conjunctions are simply riveted after abutment of the smaller channel inside the flanges of the larger channel.

Thus it is to be seen that the frame construction which utilizes the perforations and the double riveting at each conjunction forms a very stable frame which has maximum strength and, at the same time, minimum weight.

C. *Corner squaring member*

In frame construction of the prior art wherein it has been desired to cover the exterior conjunction of the sides, or sides with the top, with a curved member, it has been necessary to substantially increase the thickness of the sides or walls to allow for a gentle curve of an air-flow design. This is due to the fact that any arc swung through the apex of a 90° angle necessarily extends outside the sides of the angle. Similarly in prior art construction the interior of the conjunction of the sides or the top with the sides has uniformly been covered with a curved sheet of material such as plywood or plastic. This interior angle of conjunction has also furnished the industry with problems since there is a substantial waste of space caused by the curved finish.

One of the features of the instant invention relates to corner framing or squaring members which permits the fitter to utilize square corners for the interior construction with the advantages this permits and to allow the exerior conjunction to be covered with a sheet of metal plastic, or other resilient material in a gently sweeping curve having the desired air-flow characteristics.

The corner squaring members used in the construction of the instant invention comprises a formed sheet of aluminum or other similar material, which is W-shaped in cross sectional configuration, with each of the angles involved a right angle, and with the two outside flanges shorter than the interior sides. The corner squaring member is used to join the edges of the sides together and the top framing member with the sides. The edges of the framing members to be joined are riveted to the opposite outside shorter flanges of the corner member. In this fashion the center angle of the corner squaring member furnishes the interior and exterior conjunction angle and is flush with the inside surfaces, that is, is spaced inwardly from the exterior surfaces of the joined framing members. It is also of a dimension such that the outside surfaces of the frames are sufficiently removed from each other than a gently contoured curve having the desirable air-flow characteristics may be formed by placing a covering sheet directly on the outside surface of the frame members and fastening it directly thereto. The inner surface of the top and sides lie in the same plane as the central right angle of the squaring member, thus providing the finishing operation with a corner that is truly square.

Attachment of the corner squaring member to the sides or, sides and top, is accomplished with a series of rivets or other fastening devices with which the art is familiar. The two outside flanges of the corner squaring member are preferably the same dimension as the channel member to which they are attached.

It is to be seen therefore that the use of this feature of the inventive concept has a number of distinct advantages not the least of which is the formation of a completely sealed and rigid joint at the conjunction of two sides or the top and sides of the vehicular frame.

D. *Overall air-flow design*

Another feature of the construction of the instant invention relates to the overall air-flow design of the vehicular frame. As is well-known in aerodynamics the "tear-drop" or "air-foil" shape approaches the ultimate in the elimination of wind drag or resistance brought about mainly by turbulent after-flow. The instant vehicular construction approaches this design.

The front and rear sides or ends of the construction of the invention are divided into an upper and a lower half. Turning to the front, the upper half is necessarily set at a right angle to a parallel plane through the center of the vehicle. This angle is dictated because of the "wrap-around" window at this point. The lower half of the front frame, however, inclines inwardly from the point of conjunction with the top half at an angle of between about 8° and 15°.

The rear end is similarly divided into two halves and incline toward the front from their point of conjunction. The top half inclines inwardly at an angle between about 8° and 15° and the bottom half at an angle between about 5° and 10°.

At the front and rear upper corners of the frame, that is where the top and two sides meet, a smooth curve having the desired contour is obtained by forming a continuous elbow bend of a length of U-channel and fitting this curve to the side frames. This bend is usually made by kerfing the side flanges of the U-channel at spaced intervals and bending the resulting member into the desired shape. However this portion of the frame may be cast of one piece to the desired shape.

The invention will be more clearly explained by reference to the attached drawings in which:

FIG. 5 is a side elevation of a side framing member;

FIG. 6 is a view taken along the line 6—6 of FIG. 5;

FIG. 7 is a view taken along the line 7—7 of FIG. 5 and shows the details of the framing of an opening in the side wall;

FIG. 8 is a view taken along the line 8—8 of FIG. 5;

FIG. 9 is a fragmentary perspective view of FIG. 8;

FIG. 10 is a fragmentary perspective view of a typical joint means;

Figure 1:
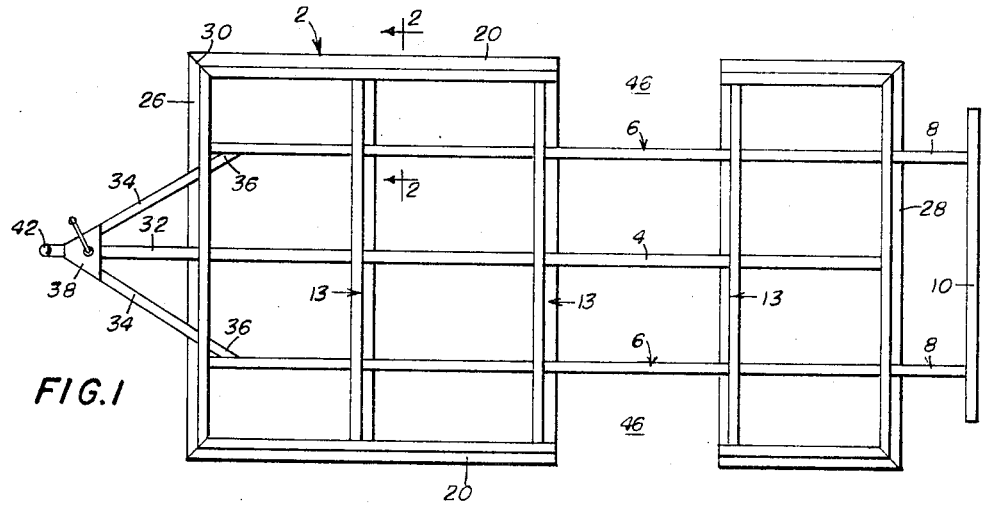
FIG. 1 represents a top plan view of the under-frame of the vehicular construction.

Turning now to the drawings, reference numeral 2 generally indicates the vehicular under-frame or chassis construction which comprises a main horizontal support member 4 and parallel spaced main support members 6 which extend at least the total length of the under-frame. As shown, the main support members 6 extend beyond the total length of the under-frame as shown at 8, and abutted against the extensions is a cross member 10 which is welded thereto and forms a bumper member for the under-frame.

Main support members 4 and 6 are tubes of rectangular cross section as is shown at 12 and may be of seamless extruded metal or may be formed from a flat plate by a breaking operation followed by a continuous weld at the conjunction of the two ends.

Figure 2:
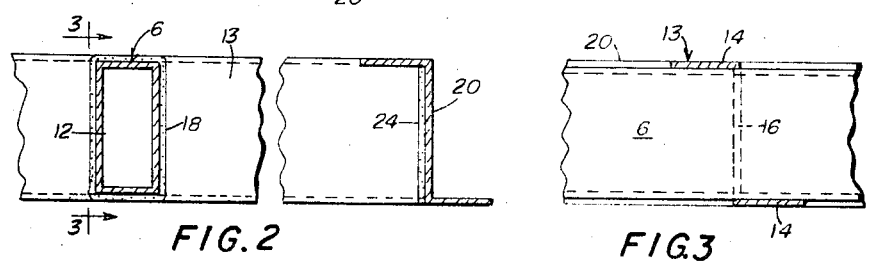
FIG. 2 represents a view taken along the line 2—2 of FIG. 1.
Figure 3:
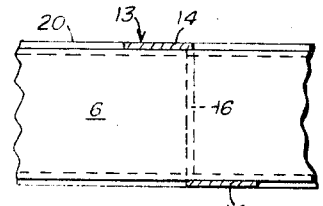
FIG. 3 is a side elevation taken along the line 3—3 of FIG. 2.

Reference numeral 13 indicates one cross-support member which is of right-angled Z configuration having parallel but opposed flanges 14 and an upright section 16 as is shown in FIG. 3. The upright section 16 is perforated to receive therethrough the main support members and they are fastened at their point of conjunction by a continuous weld shown at 18 of FIG. 2.

The outside edges of the under-frame comprises Z channel members 20 which are arranged so that the upper flange of the Z channel is directed toward the center of the frame as shown in detail in FIG. 2. The point of conjunction of the sides with the cross members is a butt joint and is fastened in position by a strip weld as is shown at 24.

In a similar fashion the forward side 26 and the rear side 28 consist of a section of Z channel identical to the cross members, the rear side 28 being perforated to allow extensions 8 to extend therethrough. The conjunction of the front member and the sides may be mitered as is shown at 30 and welded at the point of conjunction.

The towing section of the frame comprises a forward extension 32 of the main support member 4 which extends through a perforation in the front Z channel 26 and two side braces 34 which extend through dimensioned perforation in front cross member 26 and are mitered and welded to each main support member 6 as shown at 36 and to extension 32 of the main support member 4. A cover plate 38 is then superimposed on this conjunction and front supporting wheel 40 and trailer hitch 42 is attached to the joint of conjunction in a manner known to the art.

Figure 4:
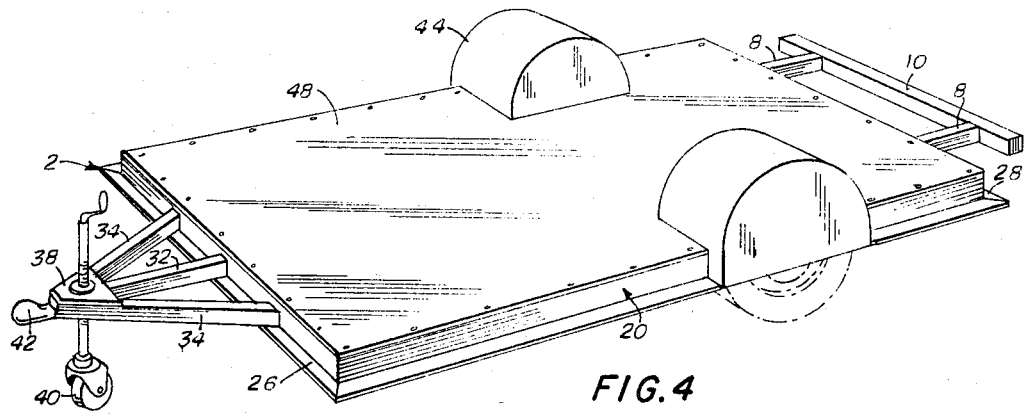
FIG. 4 is a perspective view of a completed under-frame or chassis.
Figure 11:
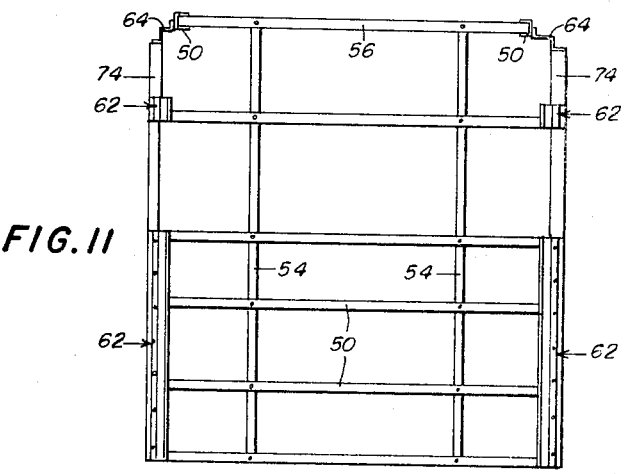
FIG. 11 is a front elevation of the construction of the invention.

Unitary wheel wells 44 are rigidly attached to the underneath side of the under-frame, fitting in spaces 46 formed by the elimination of a portion of side member 20. When the frame is assembled and the wheel wells are in place, a sheet of covering material 48 is placed over the under-frame as is shown in FIG. 4.

Figure 12:
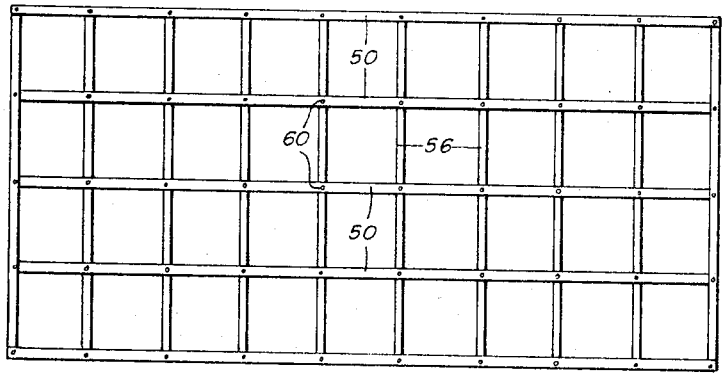
FIG. 12 is a plan view of the top framing member.

The side framing members as illustrated in FIG. 5 and the top framing member in FIG. 12 comprises a series of spaced apart horizontal members designated by reference numeral 50. These horizontal members are of U-shaped channel construction as is shown in detail in FIGS. 6, 7, 8, 10 and 13 are preferably of extruded aluminum or other light yet strong material. The bottom of the U-channel is perforated at spaced intervals as is shown at 52 of FIG. 10 to receive therethrough the vertical framing members 54 of the sides and the cross framing members 56 of the top frame. The U-channels in the side frames and the top frame uniformly open toward the center of the frame and at the point of conjunction of the horizontal members and the cross or vertical members extending therethrough the parallel flanges are riveted firmly together as is shown at 58 of FIG. 10 and at 60 of FIG. 13. Any opening that is desired in the side frame is preferably reinforced at the top and bottom thereof with an additional section of the larger U-channel as is shown in FIG. 7. In these instances the additional U-channel is positioned with the open side faced away from the center of the opening for additional strength.

An important feature of the frame construction of this invention is the corner squaring member which is used to join together two sides or a top and sides of the vehicular frame. The corner squaring members joining the sides with the ends are illustrated in FIG. 5 at reference numeral 62 and said members joining the sides with the top are shown in detail in FIG. 13 at 64. This corner squaring member comprises a continuous member of right-angled W configuration having two shorter outside flanges 66 and two interior sides 68. The conjunction of framing members, whether it be the top with the sides or the sides with the ends, are squared with this corner squaring member in that the shorter outside flanges 66 are riveted with a series of rivets as shown at 70 to the outside member of the top or sides. The corner squaring member is positioned such that the sides 68 of the central angle 72 forms an extension of the inner surface of the top and sides or two sides. This enables the builder to cover the exterior corners with a continuous piece of plastic or metal shown in phantom in FIG. 8 by attaching it directly to the outer surface of the joined framing members. It also furnishes the fitter with a completely squared angle for final finishing at the interior conjunction of the framing members.

Figure 13:
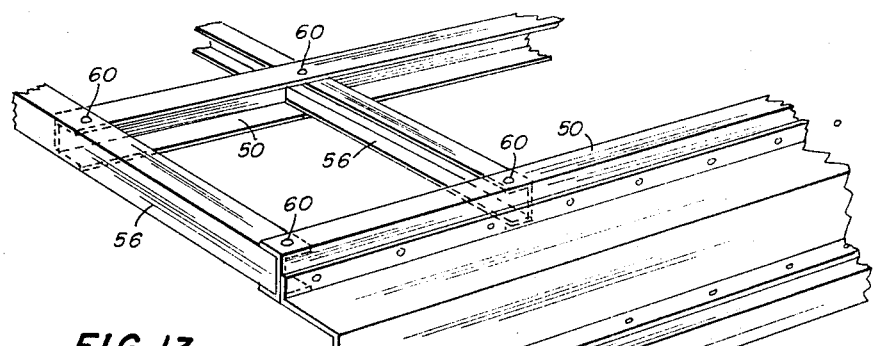
FIG. 13 is a fragmentary perspective view of the area of 13—13 of FIG. 5.

At the conjunction of the top and two sides, as is shown in FIG. 5 and FIG. 13, a curve is necessary for a smooth outside contour. This curved member is referred to by reference numeral 74. This portion of the frame may be cast into the desired shape or it may be formed from a U-channel by kerfing the flanges and the bending into the desired configuration.

The front and rear framing members are divided into two halves which meet at substantially the midpoint of the vehicular frame. From a plane running through the vehicle at the point of conjunction of the two halves, the top rear half inclines forwardly at an angle of between about 8° to 15°, preferably at about 10°, and the lower half inclines inwardly at an angle of between about 5° to 10°, preferably at about 7°.

The upper half of the front side is perpendicular to the central plane and lower half inclines toward the rear at an angle between about 5° to 10°, preferably about 7°. These angles are designed to approach, so far as is possible, consonant with space utilization, the aerodynamic air foil design to reduce after-turbulence and the concomitant wind resistance.

To reiterate briefly the instant invention relates to new and improved vehicular frames and their method of construction. The main features of the inventive concept is directed to the vehicular chassis or under-frame, the details of the top and side frame construction and the method and structure used to join the separate frame units into a rigid whole. A basic concept utilized in the invention involves the use of perpendicularly disposed framing members wherein one series of the framing members extends through perforations in another series and the individual members of each series are rigidly attached together at the point of intersection. Another major concept involves the use of a unique corner squaring member for joining two framing units together. This corner squaring, or framing, members comprises a channel of W-shape in cross section wherein all the angles involved are right angles and wherein the two outside flanges are of lesser dimension than the sides of the interior angles. These shorter outside flanges are permanently attached to the edges of the framing units being joined such that the sides of the interior angle of the squaring member are extensions of the inner surface of the framing units being joined together. An additional concept involves the construction of the front and rear framing units in two halves and inclining each half at an angle of between about 5° and 20° from the vertical to approach the air foil design to reduce wind resistance during vehicular movement.

Whereas the foregoing description represents an attempt to specifically describe the inventive concept, it is to be understood, of course, that those familiar with the art will readily perceive modifications which may be made without departing from the spirit of the invention. It is intended that this description be not limiting but that the inventive concept be delineated only by the appended claims.

What is claimed is:

1. A vehicular frame construction for towed vehicles which comprises
    an under-frame consisting of a plurality of horizontal parallel spaced main support members and a plurality of parallel spaced cross support members perforated therethrough, said main support members extending through the perforations in said cross support members and rigidly attached thereto,
    a top frame which comprises a plurality of parallel spaced horizontal framing members, and a plurality of parallel spaced cross framing members, said cross framing members extending through perforations in said horizontal framing members and rigidly attached thereto,
    a pair of opposed side frames which comprises a plurality of parallel spaced horizontal framing members and a plurality of parallel spaced vertical framing members perpendicular thereto, said vertical members extending through perforations in said horizontal framing members and rigidly attached thereto,
    a pair of rear end abutting frames, each comprising a plurality of parallel spaced horizontal framing members and a pluraltiy of parallel spaced vertical framing members perpendicular thereto, said vertical members extending through perforations in said horizontal members and rigidly attached thereto, one of said pair of frames inclining forwardly at an angle of between about 5° to 10° from the vertical, and the other of said pair inclining forwardly at an angle of between about 8° to 15° from the vertical, said inclination beginning at the point of abutment,
    a front frame comprising a plurality of parallel spaced horizontal framing members and a plurality of parallel spaced vertical framing members, said vertical members extending through perforations in said horizontal members and rigidly secured thereto, said front frame inclining outwardly from the bottom thereof at an angle of between about 5° to 10° from the vertical, and
    corner squaring members of right angled W cross-sectional configuraton interposed at the conjunction of the said top frame with said side and rear frames and at the conjunction of each side frame member with said pair of rear frames and said front frame, said corner squaring member being so adjusted that the sides of the interior angle form an extension of the inner surfaces of the conjoining frames and being rigidly secured to the ends of said conjoining frames.

2. A vehicular frame according to claim 1 wherein said under-frame main support members are of rectangular seamless metal tubing and wherein said perforated cross support members are of right-angled Z configuration in cross section.

3. A vehicular frame according to claim 1 wherein said horizontal framing members and said cross and vertical framing members are of right-angled U configuration in cross section, said horizontal framing members being of a slightly larger inside dimension than the outside dimension of said cross and vertical framing members.

4. A vehicular frame construction for towed vehicles which comprises
    an under-frame consisting of a plurality of horizontal parallel spaced main support members and a plurality of parallel spaced cross support members perforated therethrough, said main support members extending through the perforations in said cross support members and rigidly attached thereto,
    a top frame which comprises a plurality of parallel spaced horizontal framing members, and a plurality of parallel spaced cross framing members, said cross framing members extending through perforations in said horizontal framing members and rigidly attached thereto,
    a front, rear and a pair of opposed side frames which comprises a plurality of parallel spaced horizontal framing members and a plurality of parallel spaced vertical framing members perpendicular thereto, said vertical members extending through perforations in said horizontal framing members and rigidly attached thereto,
    corner squaring members of right angled W cross-sectional configuration interposed at the conjunction of the said top frame with said side and rear frames and at the conjunction of each side frame member with said pair of rear frames and said front frame, said corner squaring member being so adjusted that the sides of the interior angle form an extension of the inner surfaces of the conjoining frames and being rigidly secured to the ends of said conjoining frames.

References Cited by the Examiner

UNITED STATES PATENTS

| 2,153,058 | 4/1939 | Bashor | 280—106 |
| 2,640,570 | 6/1953 | Horowitz | 52—667 |
| 2,791,439 | 5/1957 | Swanson | 280—106 |
| 2,812,192 | 11/1957 | Cole | 280—106 |
| 3,042,423 | 7/1962 | Bock | 280—106 |

BENJAMIN HERSH, *Primary Examiner.*

P. GOODMAN, *Assistant Examiner.*